April 5, 1955  H. HARRIS, JR  2,705,792
STABILIZED RADIO TRACKING SYSTEM
Original Filed Feb. 15, 1943  3 Sheets-Sheet 3
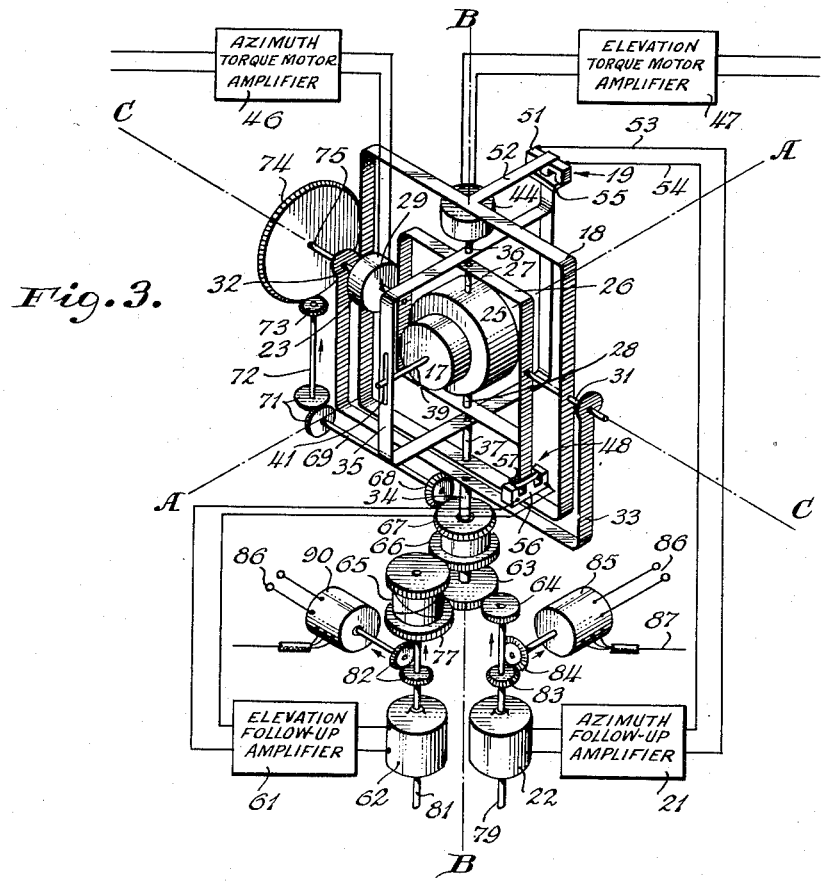
INVENTOR
Herbert Harris, Jr.
BY
ATTORNEY

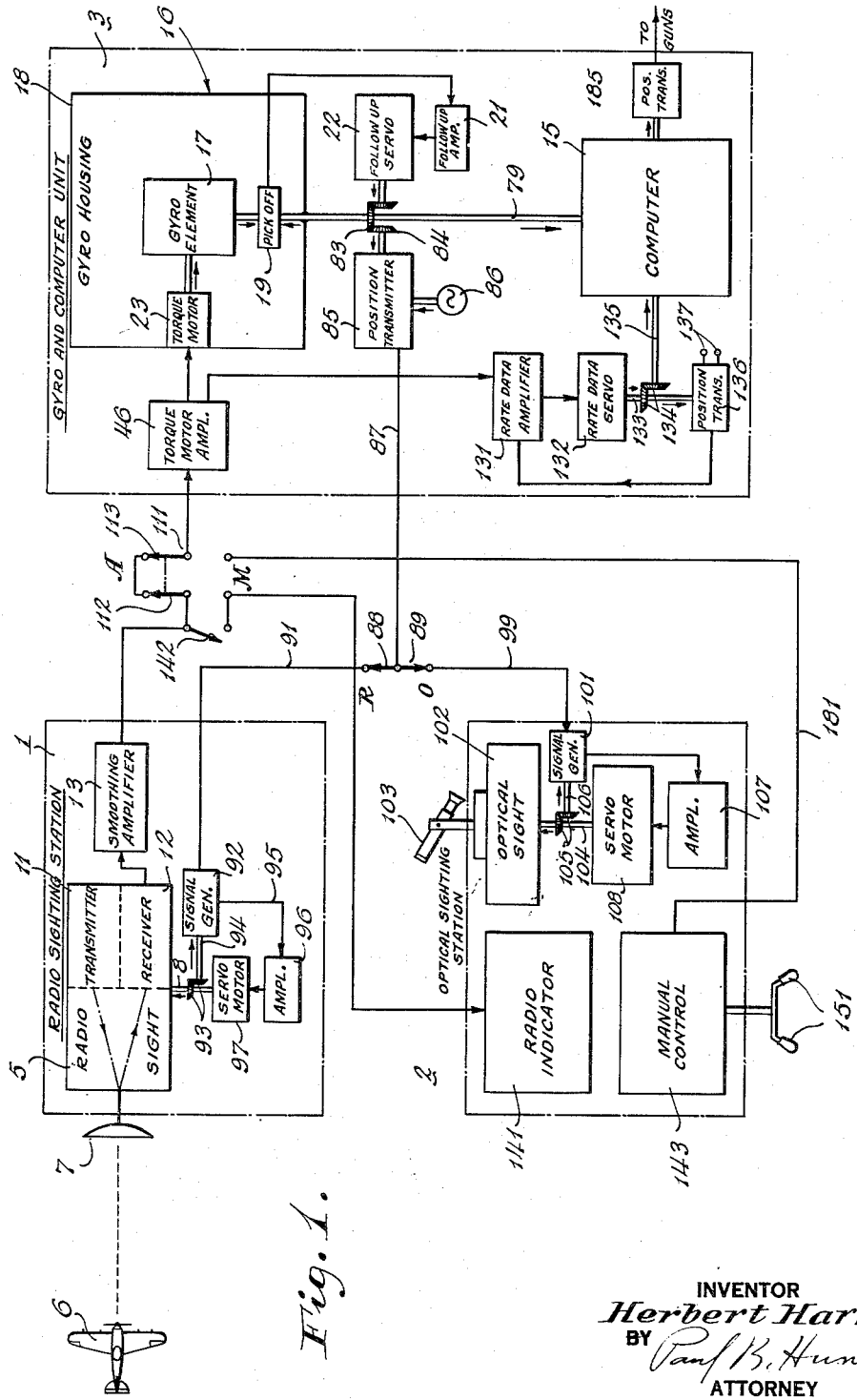

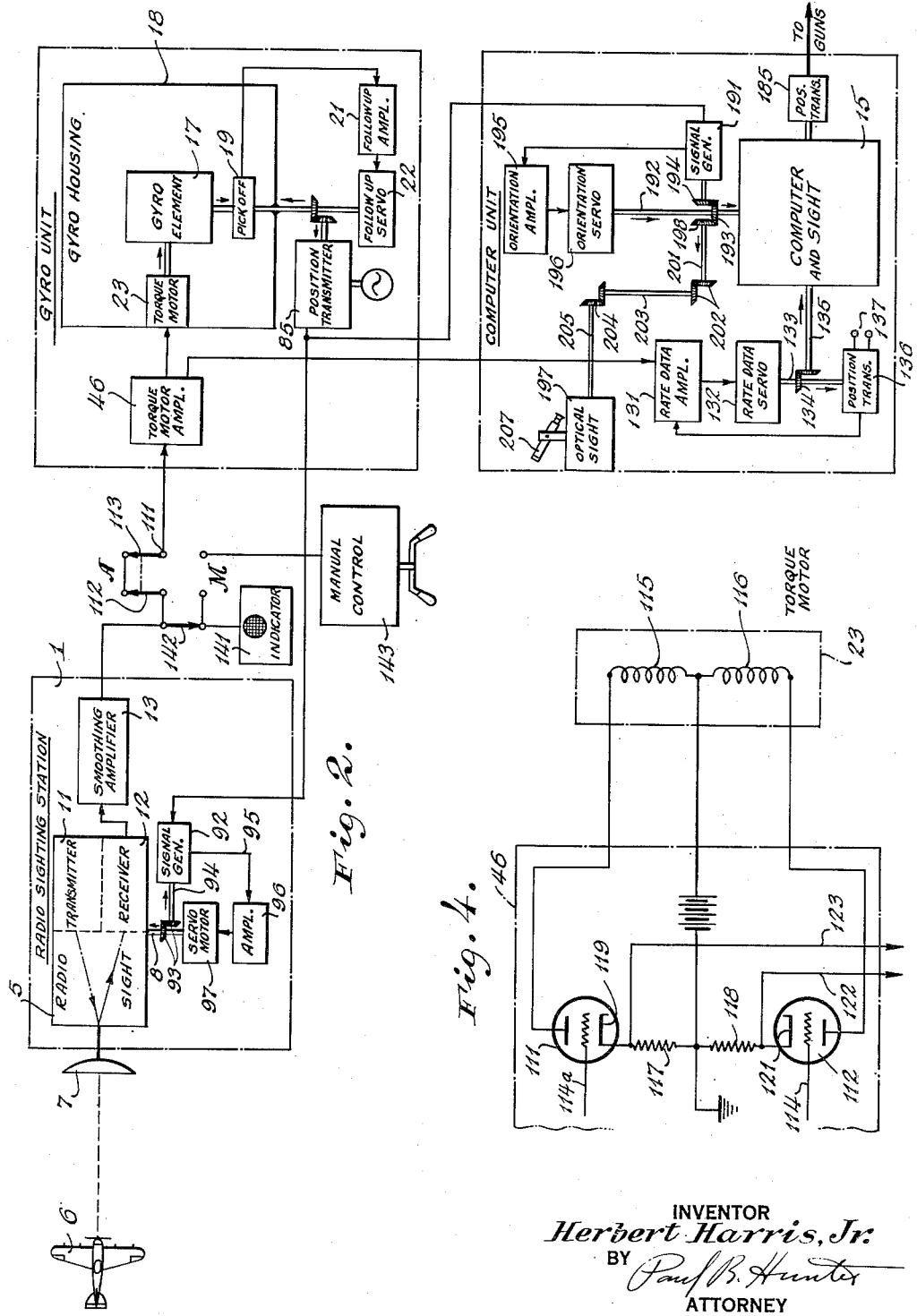

United States Patent Office 2,705,792
Patented Apr. 5, 1955

2,705,792

STABILIZED RADIO TRACKING SYSTEM

Herbert Harris, Jr., Cedarhurst, N. Y., assignor to The Sperry Corporation, a corporation of Delaware Continuation of application Serial No. 476,009, February 15, 1943. This application July 21, 1947, Serial No. 762,297

6 Claims. (Cl. 343—7.4)

This invention relates in general to stabilized fire control systems and particularly to arrangements for stabilizing automatic radio gun control systems for use on ships or aircraft.

This application is a continuation of my prior application Serial No. 476,009, filed February 15, 1943, for Stabilized Radio Gun Control System, now abandoned.

Some prior systems for stabilizing radio sights and gun controls have mounted the stabilizing gyro on the scanner to stabilize the scanner. Such a system is described and claimed in U. S. Patent No. 2,660,793, dated September 1, 1953, in the names of C. G. Holschuh et al. Other elements in such systems were stabilized by servo devices for following the scanner. However, the scanner, of necessity, is usually mounted in some more or less vulnerable position on an aircraft or ship. For this reason, it is sometimes desirable to have the stabilizing gyro a separate unit from the scanner.

In Patent No. 2,414,108 for Stabilized Gun Control and Tracking System, dated January 14, 1947, in the names of R. C. Knowles et al., a gyro is mounted separately and is utilized to stabilize the scanner, computer, and other elements of the system. However, a target can only be tracked by moving the scanner in accordance with either radio signals or signals from a manual control. In such cases it is necessary for the gyro to follow the movements of the scanner. Thus, two independent elements control the position of the scanner, namely, the tracking control and the stabilizing gyro.

In the prior systems, data supplied to the computer was determined through a chain of movements whereby either a radio or optical sight is moved by a suitable radio or manual control and movements of the sight applied torques to the gyro, which, in turn, supplied data to the computer. In the present invention data is supplied directly from the sight controls to the gyro and then to the computer, thereby securing a smooth integrated control.

According to the present invention, the gyro is mounted separately from the scanner, and is used to stabilize the scanner, an optical sight and other elements of the fire control system including a computer. Either radio or manual controls are actuated to energize a torque motor for applying torque to the gyro thereby causing it to precess at a rate proportional to the rate of movement of the target. The same mechanisms used for stabilizing the various elements are also utilized for causing the other mechanisms to follow the precession movements of the gyro. It will be apparent that this reduces to a minimum the mechanisms required for stabilization and tracking.

Since the gyro is mounted separately from the scanner, it is not as likely to be damaged during operations against an enemy. If the scanner is damaged, it is still possible to continue using the stabilized system with an optical sight and a manual tracking control. Similarly, if the optical sight is damaged, a stabilized radio control system will be available for continuing operations. It will appear from the following description that provision is made for an automatic tracking system actuated by a radio sight and a manual tracking system which may be used with either a radio sight or an optical sight. The computer is supplied with accurate data whether radio or manual tracking controls are used.

As will subsequently appear, the gyro may either be mounted integrally with the computer or separately therefrom.

One object of the invention is to provide a simplified arrangement for stabilizing a radio gun control system.

Another object of the invention is to provide a stabilized radio gun control system in which the stabilizing gyro also controls the orientation adjustments of all of the elements of the system.

A still further object of the invention is to provide a radar system in which tracking controls are connected directly to the gyro for orienting the various elements of the system and supplying rate and orientation data to the computer.

Of course, it will be understood that my system, or the main components thereof, has application in other fields and for other purposes than the control of guns. Obviously, my device may be used in any system in which it is desired to orient or furnish a guide for an object toward or with reference to what I broadly term a "target," that is, a second object or reference. In such systems, the radiant energy transmitted from such target to the guided object is used for determining the line of sight between the two objects. Such radiant energy may originate from a source on the target or be reflected by the target from a source at the guided object or elsewhere.

Other objects and advantages of the invention will become apparent from the following description taken in connection with the accompanying drawings wherein:

Fig. 1 is a schematic block diagram showing a gun control system embodying the invention.

Fig. 2 is a schematic block diagram similar to Fig. 1 but showing a modified gun control system.

Fig. 3 is a schematic perspective view of a gyro element and follower used in the systems shown in Figs. 1 and 2.

Fig. 4 is a schematic wiring diagram showing an arrangement for controlling the torque motors, and Fig. 5 is a schematic perspective view of a manual control device suitable for use in the systems shown in Figs. 1 and 2.

Referring first to Fig. 1, a complete fire control system is shown for either elevation or azimuth controlling devices. Since the controls for elevation and azimuth are identical, it is believed that a description of one will suffice for both and will avoid unnecessary complexities in the drawings as well as the description.

The system shown in Fig. 1 includes a radio sighting station unit designated generally at 1 and an optical sighting station unit designated generally at 2, which are selectively connected to a gyro computing unit designated generally at 3.

In the radio sighting station, a scanner 5 is provided for projecting radiant energy toward the target 6 and receiving reflections therefrom. The scanner 5 includes a directional antenna 7 that is mounted for movement about mutually perpendicular axes hereinafter called the "nod" and "spin" axes. The antenna 7 may be continuously rotated or spun at a constant speed about the spin axis and oscillated at a somewhat slower speed about the nod axis.

When both spinning and nodding movements are applied to the antenna, the directional beam radiated will describe a spiral pattern. If the nodding motion is stopped and the axis of the reflector of the antenna 7 fixed in a position offset with respect to the spin axis, continuation of the spinning will describe a conical pattern with the directional beam.

The scanner 5 is also mounted for movements in azimuth about a vertical axis and for movements in elevation about a horizontal axis. Only the azimuth movement is shown in the drawing whereby the scanner is rotatable about a vertical axis as by means of a shaft 8. A similar horizontal shaft would serve to rotate the scanner in elevation.

The radio sighting station also includes a transmitter 11 that may be of any suitable design for supplying radio frequency energy to the antenna 7. This transmitter may generate relatively high frequency radio energy modulated by short pulses. For convenience in the drawings, the transmitter 11 is shown mounted integrally with the scanner. However, it may be placed at any convenient position and the radio energy supplied by means of suitable wave guides and couplings to the antenna 7.

A receiver 12 for detecting energy reflected from the target 6 to the antenna 7 is also shown as mounted integrally with the scanner. However, this is again a matter of convenience and may be varied in accordance with the circumstances of specific installations. The receiver 12 is so designed that the reception of energy reflected from a target produces a signal corresponding to the orientation of the target with respect to the spin axis of the scanner. This signal as will hereinafter appear is supplied through a suitable smoothing amplifier 13 to circuits for automatically aiming guns or to indicating instruments which will show the orientation of the target with respect to the guns. In the latter case a manual control may be used to position the guns.

The gyro and computer unit 3 includes a computer 15 which is of any suitable design capable of utilizing present target position and target rate data for deriving aiming angles to direct guns toward the future position of the target and also to compensate for ballistic corrections necessary to accurately position the guns. There are several types of computers for solving the problem of directing guns toward the future position of a target. Some of these computers use accurate predictions and some approximate predictions of the future position. One particular computer suitable for use in the present system is shown in the copending application Serial No. 492,408 for Inter-Aircraft Gun Sight and Computer, filed September 17, 1941, in the names of C. G. Holschuh et al., now abandoned.

In the system shown in Fig. 1, a gyro designated generally at 16 is mounted integrally with the computer. The gyro 16 is of conventional design and includes a gyro element 17 that is supported in a housing or base comprising follow-up member 18. Gyro element 17 is free to move relative to the housing 18, relative movements about a vertical gyro axis being detected by a suitable pick-off 19. The pick-off 19 may be connected through an amplifier 21 to a follow-up servomotor 22 for moving the follow-up member 18 in accordance with relative movements of the element 17 about the aforementioned vertical axis.

Only one pick-off for detecting movements about a vertical gyro axis is shown in Fig. 1. However, a pick-off would also be arranged to detect relative movements between the gyro element 17 and the housing 18 of the gyro about a horizontal gyro axis, that is, relative elevation movements of the gyro element 17.

A torque motor 23 is mounted on the housing to apply torque to one axis of the gyro element thus causing the gyro to precess about a perpendicular axis. The azimuth torque motor 23, shown in the drawing, applies torque about a horizontal axis thus causing the gyro to precess about a vertical axis. This results in relative movement between the element and the housing which is detected by the pick-off 19. An elevation torque motor, not shown in Fig. 1, is also mounted on the gyro housing and arranged to apply torque to the gyro element about a vertical axis thus causing precession of the element about a horizontal axis.

The details of the gyro 16 may be seen more clearly in Fig. 3. The gyro rotor element 17 is mounted in a bearing frame 25 and is continuously rotated in the frame 25 about an axis A—A by suitable means not shown in the drawings. As will subsequently appear, the spin axis A—A of the gyro is maintained parallel to the line of sight. The frame 25 is pivotally mounted in a first gimbal ring 26 by trunnions 27 and 28 for movement in azimuth about a vertical axis B—B. The first gimbal ring 26 is pivotally mounted in a housing or base comprising follow-up member 18 by trunnions 29 and 31 for movements in elevation about a horizontal axis C—C, and housing 18 is supported on the trunnion 31 in a further base comprising bracket support 33 for movements in elevation about the horizontal axis C—C. Bracket 33 together with the housing 18 is movable about the axis B—B in accordance with azimuth movements of a shaft 34.

A second gimbal ring 35 is pivotally mounted by trunnions 36 and 37 in the housing or follow-up 18 for movement about the vertical axis B—B. A shaft 39 coincident with the spin axis of the gyro projects from the rotor 17 into a slot 41 in the second gimbal ring 35 whereby the gimbal ring 35 is moved about the vertical axis B—B in accordance with azimuth movements of the gyro element. Elevation movements of the gyro about the axis C—C cause relative movement between the first gimbal ring 26 and the housing 18.

The housing 18 carries the azimuth torque motor 23 having its rotor connected to the trunnion 29 on which the first gimbal ring 26 is supported. Current in the windings of the torque motor 23 will cause the rotor thereof to apply torque to the trunnion 29 and which in turn applies torque to the gyro element 17 about horizontal axis C—C. An application of torque about the axis C—C will cause the gyro to precess in one direction or another about the vertical axis B—B depending upon the direction of the applied torque. It is a well-known characteristic that the gyro precesses at a rate proportional to the torque applied. Thus the gyro precesses in azimuth at a rate proportional to the torque applied by the motor 23. Since the torque of the motor 23 depends on the current in its windings, it may be said that the gyro will precess in azimuth in accordance with the current flowing in the azimuth torque motor 23.

A similar motor 44 is also carried by the housing 18 for applying torque through the trunnion 36. This torque is applied about the vertical axis B—B and therefore causes the gyro to precess about its horizontal axis C—C. The torque applied by the elevation torque motor 44 will cause the gyro to precess in elevation at a rate proportional to the current in the windings of motor 44.

The torque motors 23 and 44 are energized by azimuth torque motor amplifier 46 and elevation torque motor amplifier 47, respectively. These amplifiers control the current in the motors 23 and 44 in a manner to be more fully hereinafter explained.

In order to detect relative movement of the gyro 17 and its associated gimbal rings 26 and 35 relative to the housing or follow-up 18, the housing 18 carries a pair of pick-offs designated generally at 19 and 48 for detecting azimuth and elevation components of the said relative movement. The pick-off 19 is the same pick-off as that shown in Fig. 1 for detecting relative movements of the gyro and the follow-up in azimuth. The pick-off 48 is similar to the pick-off 19 but is arranged to detect relative movements of the gyro and the housing in elevation.

These pick-offs may be of any suitable type depending upon the particular construction of the gyro and other design factors. One type that has been found suitable is a magnetic pick-off known as an E transformer. As may be seen in Fig. 3, the E transformer consists of a three-legged or E-shaped core 51 that is mounted on the housing 18 by an arm 52. The core 51 has windings not shown in the drawings on each leg. The center leg winding is energized from a suitable source of alternating current (not shown). The windings on the two outer legs are arranged in series opposition, these two windings being connected by means of conductors 53 and 54 to an azimuth follow-up amplifier 21.

An armature 55 is carried by the second gimbal ring 35 in a manner so it is positioned across the three legs of the core 51. When the armature 55 is in a neutral position relative to the three legs of core 51, equal voltages are induced in the windings on the two outer legs of the core. Since these windings are connected in series opposition, there will be no output as long as the armature 55 remains in its neutral position. However, when the armature 55 moves to one side or the other of its neutral position, the voltage induced in the coil toward which the armature moves is increased and the voltage induced in the other coil is decreased. Hence, the voltage output of the two windings is a reversible phase voltage depending upon the direction of the relative displacement and is of a magnitude corresponding to the amount of the displacement.

This output voltage form the pick-off 19 actuates the follow-up amplifier 21 in a manner to cause the follow-up servomotor 22 to move the housing 18 so the core 51 will be returned to its neutral position relative to the armature 55. It will be apparent that the pick-off together with the follow-up amplifier and servomotor keep the housing 18 continually in the same relative position in azimuth to that occupied by the gyro element 17.

Similarly, the pick-off 48 having core 56 and armature 57 mounted on the housing 18, and the first gimbal ring 26, respectively, detects relative movement of the housing and gyro element 17 in elevation. The output of the pick-off 48 actuates an elevation follow-up amplifier 61 that causes a suitable servomotor 62 to position the housing 18 to continually maintain it in the same relative position in elevation to that occupied by the gyro element 17.

As may be seen clearly in Fig. 3, the servomotor 22 drives pinion 64 that meshes with a gear 63 on the shaft 34 to rotate the supporting bracket 33 together with the housing 18 in azimuth. The servomotor 62 drives through a differential 65 to rotate a gear 66 that is formed integral with a bevel gear 67. The bevel gear 67 drives a bevel gear 68, which, in turn, drives through a shaft 69 and gears 71 to rotate shaft 72 and bevel gear 73. The bevel gear 73 meshes with a large bevel gear 74 to rotate shaft 75 that is connected to the housing 18 to position the housing 18 in elevation.

Since the shaft 69 and gear 68 are carried by the supporting structure for the housing, rotation of the housing in azimuth would cause the gear 68 to walk around the gear 67 thereby changing the elevation position of the gyro. In order to compensate for this erroneous movement in elevation, the gear 63, which moves in azimuth with the gyro housing, is connected to a gear 77 forming a second input for the differential 65. It will be apparent that rotation of the gear 63 together with the housing 18 in azimuth will cause the output of the differential to rotate the gear 66 the same amount whereby the gear 68 will be stationary relative to the gear 67.

Shaft 79 on the follow-up motor 22 is continuously positioned in azimuth in accordance with the position of the gyro housing. Since the spin axis A—A of the gyro element is maintained parallel to the line of sight and the housing 18 follows movements of the gyro, the azimuth servomotor 22 together with its shaft 79, will be continuously positioned in accordance with the azimuth position of the line of sight. Hence, shaft 79 may be mechanically connected to the computer 15 to drive the present azimuth position of the line of sight into the computer as clearly shown in Fig. 1.

Similarly, the elevation servomotor 62 (Fig. 3) which is not shown in Fig. 1, will drive its shaft 81 in accordance with the present elevation position of the line of sight. This shaft may also be mechanically connected to the computer 15 to drive the present elevation position data into the computer.

The azimuth follow-up motor 22 also drives through bevel gears 83 and 84 to position the rotor of a position transmitter 85 in accordance with the present azimuth position of the line of sight. The position transmitter 85 may be of any suitable self-synchronous type such as a "selsyn," "Autosyn," or "Telegon" and is energized from a suitable source 86 of alternating current. Since the rotor of the transmitter 85 is positioned in accordance with the present azimuth position of the line of sight, the output of the transmitter 85 will represent the present azimuth position of the line of sight and may be supplied by means of a cable 87 to a pair of switches 88 and 89 for connecting this output to position the radio sight and the optical sight. As will become apparent from the following description, either one or both of these sights may be connected to the transmitter 85.

When the switch 88 is closed, the output of position transmitter 85 will be supplied by a conductor 91 to a signal generator 92, the rotor of which is continuously positioned in accordance with the azimuth position of the scanner 5 by means of bevel gears 93 which connect shaft 94 of the rotor to the shaft 8 of the scanner. If the rotor of the signal generator 92 is not in synchronous position relative to the rotor of position transmitter 85, it will produce a signal in conductor 95 to actuate an amplifier 96 which operates a suitable servomotor 97 to drive the shaft 8 in a direction to position the axis of the scanner 5 in parallel relationship with the azimuth position of the axis A—A of the gyro element 17. In this manner the axis of the scanner 5 is continuously maintained parallel to the axis of the gyro element 17 and hence is stabilized in space.

If the craft carrying this system changes its attitude, the gyro housing will be moved relative to the gyro element since the housing will move with the craft and the element will remain stationary in space. The scanner will also tend to move with the craft and the gyro housing. However, the relative movement between the gyro element 17 and the housing 18 will be detected by the pick-off 19 which will act through follow-up servo 22 to reposition the housing 18 in accordance with the position of the gyro. Movement of the housing 18 will move position transmitter 85 which will, in turn, act through signal generator 92 and servomotor 97 to reposition the scanner 5 so its axis will correspond with the axis of the gyro element.

In a similar manner, when the switch 89 is closed, the output of position transmitter 85 will be connected through a conductor 99 to a signal generator 101, the rotor of which is continuously positioned in accordance with the azimuth position of an optical sighting instrument 102. The optical sighting instrument 102 carries a telescope 103 that is adapted to sight the same target 6 as is sighted by the radio sight and is positioned in azimuth by a shaft 104 that is connected through bevel gears 105 to shaft 106 on the rotor of the signal generator 101.

Generator 101 produces a signal that actuates an amplifier 107 to control a suitable servomotor 108 which adjusts the azimuth position of the optical sighting instrument 102 to agree with the position of the gyro. Thus, the optical sighting instrument 102 will be stabilized in azimuth by the gyro and the line of sight of the telescope 103 will remain substantially parallel to the spin axis A—A of the gyro.

The elevation follow-up motor 62 (Fig. 3) drives through suitable bevel gears 82 to control the rotor of an elevation position transmitter 90, the stator of which is also connected to the source 86. This elevation position transmitter controls the elevation position of the radio and optical sight in the same manner as the transmitter 85 controls their azimuth position. Signal generators, amplifiers and servomotors are provided for the elevation controls and are connected in the same manner as the equipment for the azimuth controls.

The system shown in Fig. 1 may be used optionally with either automatic or manual tracking. A double throw, double pole switch 111 has its switch arms 112 and 113 connected to the smoothing amplifier 13 and a torque motor amplifier 46, respectively. When the switch 111 is in its upper position A, the system is arranged for automatic tracking. The output for the smoothing amplifier is then connected through switch arms 112 and 113 to the torque motor amplifier 46 which, as previously described, controls a torque motor 23 to apply torque to the horizontal axis C—C of the gyro.

In automatic tracking the antenna 7 is arranged for conical scanning as previously described. The output of the receiver 12 and smoothing amplifier 13 is proportional to the displacement of the target 6 from the line of sight, that is, the displacement from the spin axis of the scanner 5. This output actuates torque motor amplifier 46 to control the torque motor 23 in a manner such that it will apply a torque to the gyro proportional to the azimuth component of the displacement of the target 6 from the spin axis of the scanner.

As is described in the above-mentioned Patent No. 2,414,108, suitable phase sensitive amplifiers and reference voltages are used to obtain the elevation and azimuth components of the displacement of the target 6 from the line of sight or spin axis of the scanner.

When the line of sight is displaced from the target, torque motor amplifier 46 will cause torque motor 23 to apply a torque about the horizontal axis C of the gyro proportional to the azimuth component of the displacement of the target 6 from the line of sight or spin axis of the scanner. This torque will cause the gyro element 17 to precess at a rate proportional to the torque applied. If the target 6 is moving relative to the line of sight, the torque applied will be proportional to the rate of movement of the target, and hence the gyro element 17 will precess at approximately the same rate as the target is moving.

Precession of the gyro element 17 results in relative movement between the gyro element 17 and the housing or follow-up 18. Hence, pick-off 19 will detect this relative movement and will actuate azimuth follow-up amplifier 21 which controls azimuth follow-up servomotor 22 to move the housing 18 in accordance with the movements of the gyro element. The follow-up servo 22 will also adjust the rotor of position transmitter 85 in accordance with movements of the gyro, and the voltage output of position transmitter 85 will thus act through signal generator 92, amplifier 96, and servomotor 97 to position the spin axis of the scanner 5 in accordance with the azimuth movements of the gyro.

From an examination of this circuit it may be seen that the spin axis or line of sight of the scanner 5 will follow movements of the target 6, and hence, automatically track the target. Similarly, movements of the position transmitter 85 in accordance with movements of the target 6, will be applied through signal generator 101, amplifier 107, and servomotor 108 to adjust the position of the optical sight 102 to maintain the line of sight of telescope 103 on the target.

It is optional to have the telescope 103 as well as the scanner follow the target by opening or closing the switch 89.

The output of torque motor amplifier 46 and its connections to the windings of the azimuth torque motor 23 is shown in detail in Fig. 4. As may be seen, the output stage of the amplifier 46 consists of a pair of electronic tubes 111 and 112. When no signal is applied to grids 114a and 114, equal currents flow in the plate circuits of the two tubes, including windings 115 and 116 of the torque motor 23. Since these windings are oppositely connected, no torque will be applied by the motor. Since the currents in the plate circuits of the tubes are equal, equal voltages will be developed across resistors 117 and 118 in the circuits of cathodes 119 and 121 of the tubes 111 and 112, respectively. For these reasons, the voltage across output conductors 122 and 123 connected to the cathodes 119 and 121 will be zero.

When a signal is applied to the torque motor amplifier 46, the voltage applied to one of the grids will be made less negative and that applied to the other grid will be made more negative. Assuming the voltage on the grid 114a is made less negative, the current in the plate circuit of tube 111, including winding 115, will increase and the current in the plate circuit of tube 112, including winding 116, decreases. The torque applied by the motor 23 will be proportional to the difference between the currents in the two windings. Similarly, the voltage between conductors 122 and 123 will be equal to the difference between the voltage drops across resistors 117 and 118. This difference is also proportional to the difference in the currents in the plate circuits of the two tubes, so the voltage across the two resistors, as taken off by leads 122 and 123, is proportional to the torque applied by the motor 23.

Since the applied torque is proportional to the precession rate of the gyro and the gyro precesses at the same rate as the target 6 is moving, the voltage across leads 122 and 123 is proportional to the rate of movement of the target. This voltage is utilized to actuate a rate data amplifier 131 (Fig. 1) which controls a rate data servomotor 132 that is arranged to drive a shaft 133 in accordance with the rate of movement of the target 6.

The shaft 133 is connected through suitable bevel gears 134 to rotate a shaft 135 that drives the rate data into the computer 15. The shaft 133 also drives a position transmitter 136 which may be a potentiometer that is energized from a suitable voltage source 137. As the shaft 133 rotates to drive rate data in to the computer, the voltage output of the transmitter 136 will be varied accordingly. This voltage output is supplied to the rate data amplifier 131 and compared therein to the rate voltage from the torque motor amplifier 46.

The rate data amplifier 131 causes the rate data servo 132 to rotate the shaft 134 until the voltage from the transmitter 136 is equal to the voltage from the torque motor amplifier 46. When these voltages are equal, the shaft 134 will have rotated an amount equal to the target rate. It will be apparent that the shafts 133 and 135 will be continuously positioned in accordance with the rate of the target and, therefore, rate data will be continuously supplied to the computer.

When the switch 111 is positioned as shown in the drawing for automatic tracking, the output of the radio smoothing amplifier 13 may be optionally connected to a radio indicator 141 by means of a switch 142. This indicator may be a cathode ray tube having its deflecting plates connected to the amplifier 13 in a manner to show the displacement of the scanner's spin axis from the target. Thus, when the switch 142 is closed, the indicator 141 will provide the operator with a visual indication of the position of the line of sight (spin axis) of the scanner 5 relative to the target 6.

When it is desired to manually track the target 6, the switch 111 is moved to its lower position M whereby the indicator 141 is connected by switch arm 112 to the smoothing amplifier 13 to give an indication of the position of the target 6 relative to the line of sight of the scanner 5. The torque motor amplifier 46 is connected through switch arm 113 to manual control 143 that may be of any suitable type such as that shown in Fig. 5.

The manual control shown in Fig. 5 includes handles or grips 151 arranged in handle-bar fashion and adapted to be rotated about a horizontal axis D—D of connecting shaft 152 in accordance with elevation movements desired and about a vertical axis E—E in accordance with azimuth movements desired.

Movements of the grips 151 about the horizontal axis D—D cause the shaft 152 to rotate a pinion 153 that engages a cylindrical rack 154. The rack 154 is connected by means of shaft 155 to another cylindrical rack 156 which meshes with a pinion 157 to rotate a slide arm 158 of a potentiometer 159 in accordance with movements of the grips 151. The potentiometer 159 is connected across a suitable source of current 161 and output conductors 162 and 163 are connected to the mid-point of the potentiometer and the slide arm 158, respectively. It will be apparent that the voltage across conductors 162 and 163 will be of a sense corresponding to the direction of the movement of the grips 151 and a magnitude proportional to the displacement of the grips 151 from their neutral position.

Movements of the grips about the vertical axis E—E cause rotation of a bevel gear 165 which meshes with another bevel gear 166 to rotate slide arm 167 of a potentiometer 168 in accordance with the movements of the grips. Potentiometer 168 is connected across a suitable source of current 169, and output leads 171 and 172 are connected between the mid-point of potentiometer 168 and the slide arm 167, respectively. Thus, movements of the grips 151 in azimuth will produce a voltage across leads 171 and 172 corresponding in sense to the direction, and in magnitude to the movement of the grips 151 from their neutral azimuth position.

The outputs of potentiometers 159 and 168 are connected to the elevation torque motor amplifier 47 and the azimuth torque motor amplifier 46, respectively. The manual control shown in Fig. 5 forms a convenient arrangement for manually applying torques to the gyro to cause it to precess in azimuth and elevation to follow a target Assuming the radio sight is being used, the operator will adjust grips 151 to position the spin axis or line of sight of the scanner until it is on the target 6 as shown by the indicator 141. Fig. 1 shows only the connection from the manual control 143 to the azimuth torque motor 46, the output which corresponds to the connections from potentiometer 168 to azimuth torque motor 46. This connection is designated schematically as conductor 181, which is connected to switch arm 113 when the switch 111 is in its lower or manual position. As has been previously stated, similar equipment would be provided for the elevation control to apply signals from the potentiometer 159 to the elevation torque motor amplifier 47 and cause precession of the gyro in elevation by the application of torque through torque motor 44 (Fig. 3).

The manual tracking control may be used with either the radio or optical sights. When the optical sight is used, the operator observes the target through telescope 103 and moves grips 151 to precess the gyro in accordance with movements of the target. As has been previously explained, precession of the gyro will cause movements of the optical sight in accordance with movements of the gyro.

Rate data is supplied to the computer in an identical manner whether maunal or automatic tracking is used. For manual tracking a voltage from torque motor amplifier 46 will be supplied to rate data amplifier 131 in the same manner as that previously described in connection with automatic tracking. This data is identical in both cases because both the manual and automatic tracking controls act to energize torque motor 23 in a manner to apply torque to the gyro. Since the gyro precesses at a rate proportional to the toque applied, it is immaterial insofar as the computer is concerned whether the rate data is first controlled manually or automatically.

During either manual or automatic tracking either or both of the sights may be stabilized by the gyro and either or both of the sights may be arranged to follow movements of the gyro in accordance with movements of the target. Since the present orientation data supplied to the computer is also determined by the gyro, this data will be stabilized and will correspond exactly at all times to the position of the line of sight since the spin axis of the gyro sight is parallel to the line of sight.

The rate data supplied to the gyro is also stabilized, thus preventing false rates due to changes in the attitude of the craft from being supplied to the computer. Without the stabilization of the rates, the false rates introduced into the computer would cause false predictions, thereby greatly reducing the accuracy of the system. Since these rates are determined by the precession rates of the gyro, they are independent of movements of the craft and depend solely upon movements effected to maintain the axis of the gyro element parallel to the line of sight. In this manner only true or stabilized rates are introduced for prediction computation in the computer.

Summarizing the operation of the system shown in Fig. 1, the operator first positions the switch 111 in the manual position M and uses either the radio sight or the optical sight to pick out a desired target. Once the target is selected, the operator adjusts grips 151 to the manual control to bring the line of sight onto the target. At this time, the switch 111 may be moved to its automatic position A whereby the output of the radio smoothing amplifier 13 will continually maintain the line of sight of the scanner 5 on the target. If either of the sights is disabled during operation, the other sight may be used to continue operation of the guns. Both sights are available for use with a completely stabilized system and identical information is supplied to the computator 15.

On the basis of the present orientation position data and the rate data supplied to the computer 15, the future position of the target is predicted and gun aiming angles determined for directing the guns toward the future position. These gun aiming angles may be transmitted to the guns in any suitable manner, as for example, by position transmitter 185. Since all of the elements of the system are positioned in accordance with the spin axis of the gyro, all of the elements will be stabilized in space. Also, all of the elements will be continuously positioned in accordance with the line of sight the spin axis of the gyro is continuously maintained parallel to the line of sight.

The system shown in Fig. 2 is similar to that shown in Fig. 1 except the gyro unit is separated from the computer and the optical sighting station is mechanically connected to the computer. The radio sighting station 1 is identical to that previously described in connection with Fig. 1. The elements of the radio sighting station have been designated by the same reference numerals, and it is believed that further description thereof is unnecessary. Similarly, a switch corresponding to the switch 111 is arranged to connect the smoothing amplifier 13 to the torque motor amplifier 46 or to the indicator 141 depending upon whether the switch arms 112 and 113 are in their upper automatic position A or lower manual position M. When in the lower position, the torque motor amplifier 46 is connected by switch arm 113 to the manual control 143 that may be similar to the manual control previously described in connection with Fig. 5.

The gyro unit is the same as that shown in Fig. 3 and includes the gyro rotor element 17 with its associated gimbal rings, housing 18 and pick-off 19 for detecting relative azimuth movements between elements 17 and housing 18. The pick-off 19 actuates the amplifier 21, causing the follow-up servomotor 22 to adjust the position of the gyro housing or follow-up 18 to correspond with the position of the gyro element. The torque motor amplifier 46 is adapted to control the torque motor 23 to apply torque to the horizontal axis of the gyro to cause the gyro element 17 to precess in azimuth at a rate proportional to the torque applied.

The follow-up servomotor 22 also adjusts the rotor of the position transmitter 85 in accordance with the azimuth position of the gyro housing or follow-up member 18. The position transmitter is connected to the signal generator 92 to continuously maintain the spin axis or line of sight of the scanner parallel to the spin axis of the gyro 17.

Instead of mechanically supplying the present azimuth position of the gyro housing to the computer as was done by shaft 79 in the previously described system, orientation data is now electrically supplied to the computer. The output of position transmitter 85 is connected to a signal generator 191, the rotor of which is positioned in accordance with shaft 192 that is adapted to drive present azimuth position data into the computer 15 in a manner similar to that in which the same data was supplied by the shaft 79. The rotor of the signal generator is connected to the shaft 192 by suitable bevel gears 193 and 194. The output of the signal generator actuates an orientation amplifier 195 which causes an orientation servomotor 196 to position the shaft 192 in accordance with the azimuth position of the gyro. When the gyro changes its azimuth position, the change in the output of position transmitter 85 will act through signal generator 191 and orientation amplifier 195 to reposition the shaft 192 and also the rotor of the signal generator 191 in accordance with the change in azimuth position. In this manner, the present azimuth position of the gyro is continuously driven into the computer by shaft 192.

An optical sight 197, corresponding to the sight 102 in the previous system is mechanically positioned in accordance with the position of the gyro by suitable gearing including a bevel gear 198 that meshes with the gear 193 on the shaft 192. Rotation of the shaft 192 drives through gears 193 and 198 to rotate shaft 201, gears 202, shaft 203, gears 204, and shaft 205 to position the sight in accordance with the position of the shaft 192. This maintains the line of sight of telescope 207 parallel to the spin axis of the gyro element.

Stabilized data corresponding to the rate of movement of the target is supplied to the computer 15 in the same manner as this data was supplied in the previously described system. A voltage from the torque motor amplifier 46 actuates the rate data amplifier 131 to control rate data servo 132 which drives shaft 133 through suitable gears 134 to adjust shaft 135 in accordance with the rate of movement of the target.

Stabilization of this modified system is effected in substantially the same manner as the system shown in Fig. 1. The radio sight follows the gyro and is thereby stabilized. Electrical connections are substituted for mechanical connections to drive present orientation data into the computer. Since this orientation data is determined by the gyro element 17, the data is stabilized in space. The optical sight, being positioned in accordance with the orientation data supplied to the computer, is therefore also stabilized.

Computer 15 utilizes the stabilized orientation data and the rate data to predict a future position of the target and determine gun aiming angles for directing guns toward said future position. These gun aiming angles are transmitted to the guns by the position transmitter 185.

During automatic tracking operations, use of the indicator 141 is optional, it being controlled by a switch 142 in the manner described in connection with the system shown in Fig. 1. Either manual or automatic tracking control may be used depending upon the position of switch 111. When manually tracking the target, the operator may observe the position of the line of sight of the scanner 5 relative to the target by means of the indicator 141 or he may observe the target through the telescope 207. In either case a manual control 143 is operated to cause the gyro to precess at a rate corresponding to the rate of movement of the target.

In both of the systems described, changes in attitude of the craft are immediately compensated by the action of the gyro which stabilizes the gyro housing, the sighting instruments, and the computer. Assuming the target is not moving in space relative to the line of sight, the gyro element 17 will remain stationary and changes in attitude of the craft will be compensated by maintaining all of the elements of the system in positions corresponding to the position of the gyro element. When the target is moving, stabilized rate data is supplied to the computer.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A stabilized directive radio system comprising a directive antenna, means for supporting said antenna for freedom about at least one axis, a gyroscope separated from said antenna and including a base and a gimballed suspension thereon, means including a radio receiver coupled to said antenna for producing output signals varying according to the direction of said antenna with respect to a target to be tracked, means coupled to said receiver and responsive to said output signals for applying precessional torque to said gyroscope, means coupled to said gyroscope suspension for providing a measure of the angular disposition of the gyroscope spin axis with respect to said gyroscope base, and servo means responsive thereto for varying the position of said antenna relative to its base through an angle equal to the angle of displacement of said gyroscope with respect to said gyroscope base.

2. A stabilized directive radio system as defined in claim 1 and further comprising an optical sighting system including an optical sight, and servo means responsive to movement of said gyroscope for varying the position of said optical sight through an angle equal to the angle of displacement of said gyroscope with respect to said gyroscope base.

3. A stabilized directive radio system as defined in claim 1 and further comprising indicator means coupled to said receiver and responsive to said output signals for indicating the orientation of said antenna with respect to said target, a manually operable device for applying precessional torque to said gyroscope, and switch means for alternatively connecting said radio receiver or said manually operable device to said torque applying means for tracking the target.

4. A stabilized directive radio system as defined in claim 3 and further comprising an optical sight and servo means responsive to movement of said gyroscope for varying said optical sight through an angle equal to the angle of displacement of said gyroscope with respect to said gyroscope base.

5. A stabilized radio tracking system comprising an orientable antenna, radio means coupled to said antenna for producing output signals variable according to the direction of said antenna with respect to a target to be tracked, a gyroscope separate from said antenna comprising a follow-up member and a gimballed suspension thereon supporting the rotor element of said gyroscope, means coupled to said radio means for applying precessional torque to said gyroscope proportional to said output signals whereby said gyroscope changes position relative to said follow-up member, means including pick-off means on said follow-up responsive to movements of said gyroscope for moving said follow-up member back to its original relative position with respect to the gimbal means of said gyroscope, and means responsive to movement of said follow-up member to orient said antenna towards said target.

6. A stabilized radio tracking system as defined in claim 5 and further including a computer mechanism for positioning guns, and means responsive to movement of said follow-up member for supplying target orientation data to said computer for control positioning of the guns.

References Cited in the file of this patent

UNITED STATES PATENTS

| | | |
|---|---|---|
| 1,384,868 | Sperry et al. | July 19, 1921 |
| 2,399,426 | Bradley | Apr. 30, 1946 |
| 2,427,029 | Stearns | Sept. 9, 1947 |
| 2,445,213 | Evans | July 13, 1948 |